United States Patent
Damstra et al.

(10) Patent No.: US 6,542,188 B1
(45) Date of Patent: Apr. 1, 2003

(54) COLOR CAMERA AND METHOD FOR OBTAINING AN ELECTRONIC HALF PIXEL OFFSET

(75) Inventors: Nicolaas J. Damstra, Breda (NL); Petrus G.M. Centen, Breda (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/149,946

(22) Filed: Sep. 9, 1998

(30) Foreign Application Priority Data

Sep. 11, 1997 (EP) .............................. 97202806

(51) Int. Cl.[7] .................................. H04N 9/09
(52) U.S. Cl. .......................... 348/265; 348/272
(58) Field of Search ............................ 348/222.1, 262, 348/263, 264, 265, 266, 272, 274, 275, 294, 312, 273; H04N 5/335

(56) References Cited

U.S. PATENT DOCUMENTS 4,731,656 A * 3/1988 Dischert et al. ............ 348/249
5,219,612 A * 6/1993 Bingham et al. ............. 118/60
5,517,244 A 5/1996 Stekelenburg et al. ...... 348/305
5,886,740 A * 3/1999 Nagata et al. ............... 348/265

FOREIGN PATENT DOCUMENTS

EP 0476421 A1 3/1992

OTHER PUBLICATIONS

"Interlacing in Charge–Coupled Imaging Devices" by Carlo H. Sequin, in IEEE Transactions on Electron Devices, vol. ED–20, No. 6, Jun. 1973, pp. 535–541.

* cited by examiner

Primary Examiner—Tuan Ho
(74) Attorney, Agent, or Firm—Steven R. Biren

(57) ABSTRACT

In a method of generating red, green and blue color signals, the red, green and blue color signals are picked up by red, green and blue color sensors each having a horizontal read-out register, while first n-phase clock signals ($\phi_{C1}$, $\phi_{C2}$, $\phi_{C3}$), generated (DEL) from a pixel clock signal (f), are processed (MUX-G) to obtain second n-phase clock signals ($\phi_{C1}(G)$, $\phi_{C2}(G)$, $\phi_{C3}(G)$) for the read-out register of the green color sensor in order to obtain an electronic half pixel offset for the green color signal with respect to the red and blue color signals.

7 Claims, 2 Drawing Sheets

COLOR CAMERA AND METHOD FOR OBTAINING AN ELECTRONIC HALF PIXEL OFFSET

BACKGROUND OF THE INVENTION

Description of the Related Art

The invention relates to a method and a device for obtaining an electronic half pixel offset, and to a camera including such a device.

European Patent Application EP-A-0,476,421 discloses a circuit for producing a brightness signal from an output signal of a solid-state image pick-up apparatus using spatial pixel shift. In a color camera, red, green and blue solid-state image sensors each have a number of light-receiving elements arranged in a matrix to derive red, green and blue color signals. The light-receiving elements of the green solid-state image sensor are shifted in the horizontal scanning direction with respect to those of the red and blue solid-state image sensors over a distance which is equal to a half of a pitch of the arrangement of the light-receiving elements in the horizontal scanning direction. The camera further comprises a delay circuit for delaying the sampled green color signal by a delay time which corresponds to this half pitch.

The presence of delay lines constitutes a problem in the case of scan reversal, as the electronic correction in the green channel then has to change its sign.

SUMMARY OF THE INVENTION

It is, inter alia, an object of the invention to provide an electronic half pixel offset without using delay lines to compensate for the half pixel offset of the green sensor with regard to the blue and red sensors. To this end, a first aspect of the invention provides a method and a device for obtaining an electronic half pixel offset. A second aspect of the invention provides a method and a camera for generating red, green and blue color signals.

In a method of generating red, green and blue color signals in accordance with a primary aspect of the invention, the red, green and blue color signals are picked up by means of red, green and blue color sensors each having a horizontal read-out register, while while first n-phase clock signals, generated from a pixel clock signal, are processed to obtain second n-phase clock signals for the read-out register of the green color sensor in order to obtain an electronic half pixel offset for the green color signal with respect to the red and blue color signals. A correction delay is thereby avoided. Delay correction at scan reversal is also simplified: one only needs to shift the starting instant of the pulses of the horizontal shift register over one pixel clock pulse. The invention is cheaper than the prior art solution and can more easily be cast in an integrated circuit. Moreover, the half pixel offset can be made in a more accurate manner.

In a preferred embodiment, the green signal is shifted in time over exactly half a pixel period by inverting the phase of the clock pulses for the green sensor with regard to the phases of the clock pulses for the red and blue sensors during shifting of the green color signal out of the horizontal shift register of the green sensor. This holds for 2 and 3-phase horizontal registers. For a 4-phase horizontal register, the pulses need to be interchanged cyclically.

These and other aspects of the invention will be apparent from and elucidated with reference to the embodiments described hereinafter.

DESCRIPTION OF THE PREFERRED EMBODIMENTS

Figure 1:
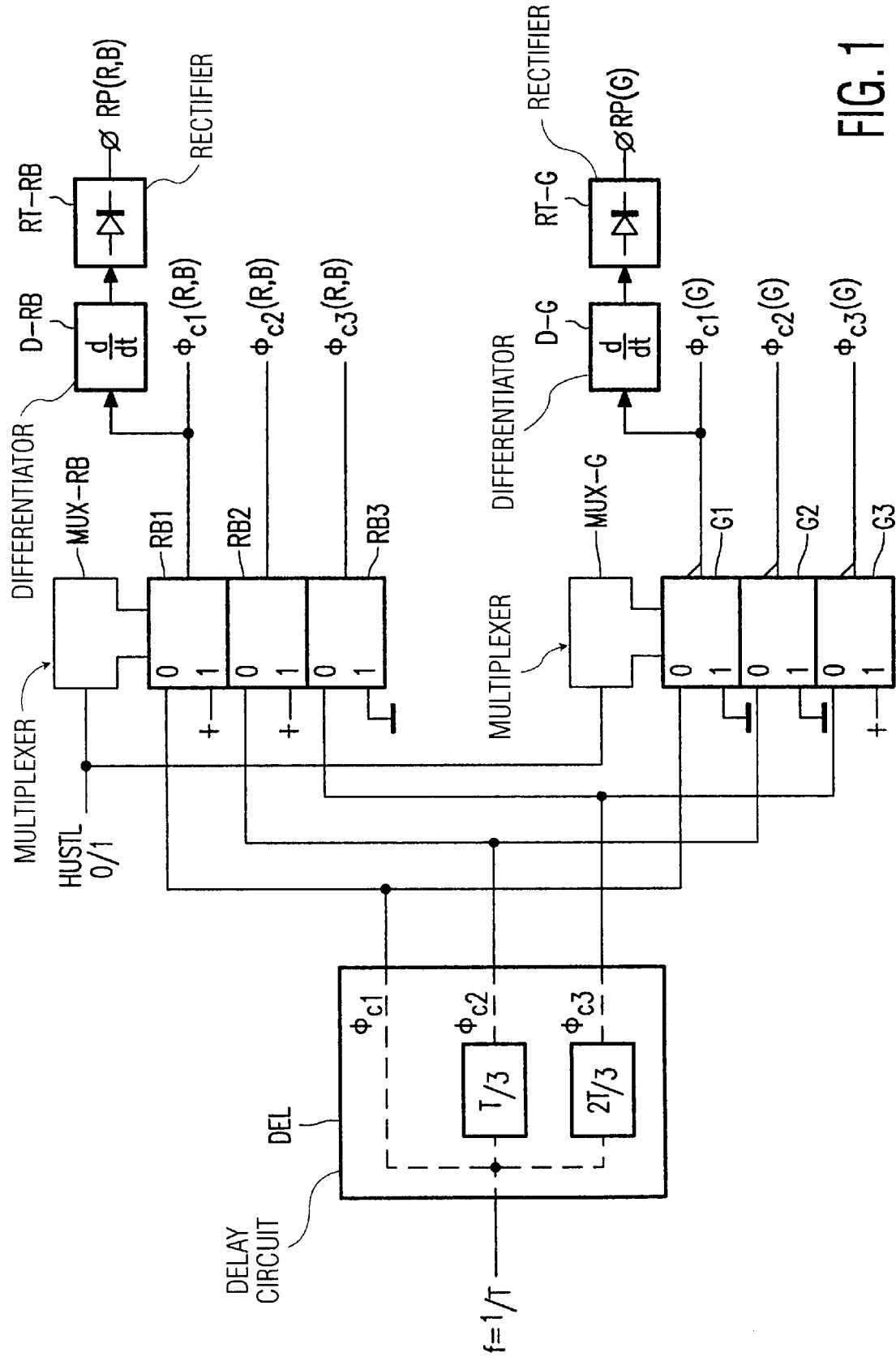
FIG. 1 shows an embodiment of a clock generation circuit in accordance with the present invention.

The clock generation circuit embodiment of FIG. 1 is applicable with a 3-phase image sensor as known from, for example, U.S. Pat. No. 5,517,244 (Attorneys' docket PHN 13,786) and the article "Interlacing in charge-coupled imaging devices" by C. H. Séquin, IEEE Transactions on Electron Devices, Vol. ED-20, No. 6, June 1973, pp. 535–541. The IEEE article also mentions even-phase charge transfer structures. Such known image sensors do not need to be described in this disclosure.

A pixel clock frequency signal $f=1/T$ is applied to a delay circuit DEL for supplying an undelayed first clock signal $\phi_{C1}$ a second clock signal $\phi_{C2}$ which has been delayed over $T/3$, and a third clock signal $\phi_{C3}$ which has been delayed over $2T/3$. The three clock signals $\phi_{C1}$, $\phi_{C2}$ and $\phi_{C3}$ are applied to respective 0-inputs of three multiplexer sections RB1, RB2 and RB3 of a first, non-inverting multiplexer MUX-RB to obtain three respective clock signals $\phi_{C1}(R,B)$, $\phi_{C2}(R,B)$ and $\phi_{C3}(R,B)$ for the red and blue image sensors RS and BS of FIG. 2. The three clock signals $\phi_{C1}$, $\phi_{C2}$ and $\phi_{C3}$ are also applied to respective 0-inputs of three multiplexer sections G1, G2 and G3 of a second, inverting multiplexer MUX-G to obtain three respective clock signals $\phi_{C1}(G)$, $\phi_{C2}(G)$ and $\phi_{C3}(G)$ for the green image sensor GS of FIG. 2. The 1-inputs of the multiplexer sections RB1 and RB2 receive a high signal, while the 1-input of the multiplexer section RB3 receives a low signal. The 1-inputs of the multiplexer sections G1 and G2 receive a low signal, while the 1-input of the multiplexer section G3 receives a high signal. The multiplexers MUX-RB and MUX-G are controlled by a hustle signal HUSTL 0/1 which indicates whether the signals at the 0-inputs or the signals at the 1-inputs of the multiplexer sections are supplied at the outputs. The half pixel offset for the green channel is obtained by the fact that the outputs of the multiplexer sections of the multiplexer MUX-G are inverted outputs.

If the hustle signal HUSTL 0/1 is 1, the output clock signals are fixed as follows: all output clock signals $\phi_{C1}(R, B)$, $\phi_{C1}(G)$, $\phi_{C2}(R,B)$ and $\phi_{C2}(G)$ are high, while both output clock signals $\phi_{C3}(R,B)$ and $\phi_{C3}(G)$ are both low. This makes it possible to pass the charges in the last line of the storage part SP of a frame transfer sensor RS, GS, BS to the horizontal shift register HR of FIG. 3. By applying the inverse of the signals applied to the 1-inputs of the non-inverting multiplexer MUX-RB to the 1-inputs of the inverting multiplexer MUX-G, it is achieved that the same (correct) charge shift from the storage part SP to the horizontal shift register HR of FIG. 3 is carried out in all of the three CCD image sensors RS, GS and BS.

Figure 2:
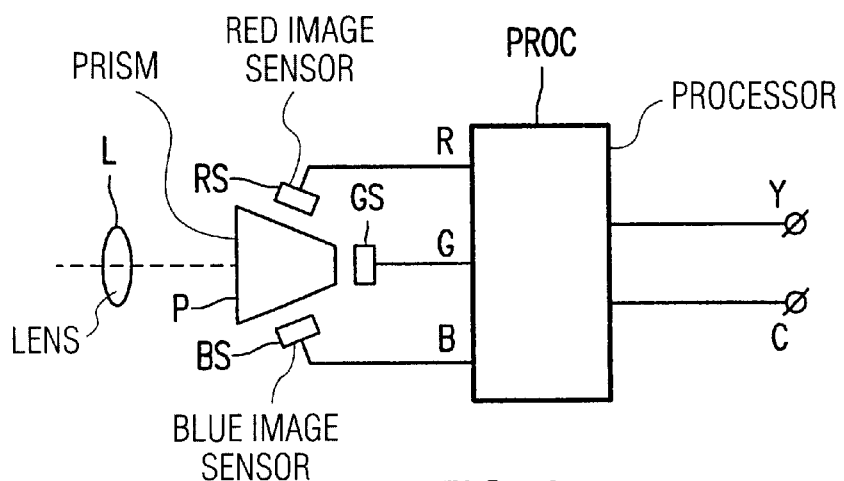
FIG. 2 shows an embodiment of a camera in accordance with the present invention.

FIG. 2 shows an embodiment of a camera in accordance with the present invention. The camera comprises a lens L, a prism P, a red image sensor RS, a green image sensor GS, and a blue image sensor BS. Color signals R, G and B picked up by the image sensors RS, GS and BS are applied to a processor PROC which furnishes a luminance signal Y and a chrominance signal C.

Figure 3:
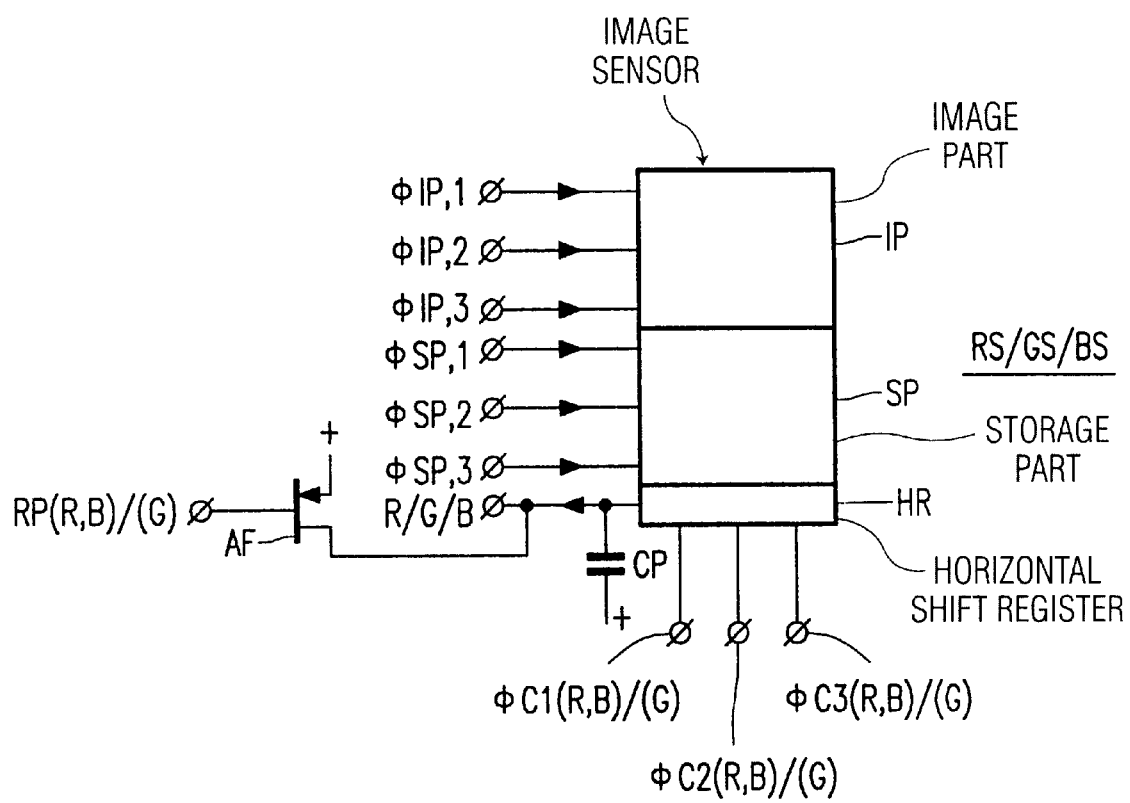
FIG. 3 shows an embodiment of a 3-phase image sensor for use in the camera embodiment of FIG. 2.

FIG. 3 shows an embodiment of a 3-phase image sensor RS, GS or BS for use in the camera embodiment of FIG. 2. The frame transfer sensor comprises in known manner an image part IP, a covered storage part SP, and a horizontal read-out shift register HR. In accordance with the present invention, the horizontal read-out shift register HR is clocked by the output clock signals $\phi_{C1}(R,B)/(G)$, $\phi_{C2}(R,B)/(G)$ and $\phi_{C3}(R,B)/(G)$ of the clock signal generator of FIG. 1. The horizontal shift register HR supplies the sensor output signal R, G or B. The image part IP is clocked by, for example, three image part clock signals $\phi_{IP.1}$, $\phi_{IP.2}$ and $\phi_{IP.3}$. The storage part SP is clocked by, for example, three storage part clock signals $\phi_{SP.1}$, $\phi_{SP.2}$ and $\phi_{SP.3}$. The image part IP and/or the storage part SP are clocked independently of the clocking for the horizontal shift register HR. In one embodiment, the image part IP and/or the storage part SP have 4-phase clock signals, while the horizontal shift register HR has a 3-phase clock signal. As mentioned above, the horizontal shift register HR may alternatively have 2-phase clock signals with inverted phases for green, or a 4-phase clock signal with cyclically interchanged clock signals for green.

The charges from the horizontal shift register HR are transferred to a capacitor CP to convert these charges into voltages. Before the charge of a subsequent pixel can be transferred to the capacitor CP, the capacitor CP should be discharged by means of a reset-FET RF. The reset-FET RF is controlled by a small reset pulse RP(R,B) or RP(G) which coincides with the rising edge corresponding to the $\phi_{C1}$ pulse at the end of the horizontal shift register HR.

In FIG. 1, a cascade connection of a differentiator D-RB/D-G and a rectifier RT-RB/RT-G generates the reset pulse RP(R,B)/RP(G) in dependence on the $\phi_{C1}(R,B)/\phi_{C1}(G)$ clock signal.

It should be noted that the above-mentioned embodiments illustrate rather than limit the invention, and that those skilled in the art will be able to design many alternative embodiments without departing from the scope of the appended claims. The invention is not limited to applications with the sensor matrix known from EP-A-0,476,421. Other matrices, like those comprising sub-arrays of 2 green, 1 red and 1 blue colored light-receiving elements, or 2 green and 1 alternatingly red or blue colored light-receiving elements, are possible as well. The invention can be implemented by means of hardware comprising several distinct elements, and by means of a suitably programmed computer. In the device claim enumerating several means, several of these means can be embodied by one and the same item of hardware.

What is claimed is:

1. A method of obtaining an electronic half pixel offset for one color signal with respect to other color signals, said method comprising the steps:

generating first n-phase clock signals from a pixel clock signal; and processing said first n-phase clock signals to form second n-phase clock signals in order to obtain said electronic half pixel offset for said one color signal.

2. A method as claimed in claim 1, wherein n equals 2 or 3 and said processing step includes the step:

inverting said first n-phase clock signals to form said n-phase clock signals for said one color signal.

3. A method as claimed in claim 1, wherein n equals 4 and said processing step includes the step:

cyclically interchanging said first n-phase clock signals to form said second n-phase clock signals for said one color signal.

4. A method of generating red, green and blue color signals, said method comprising the steps:

picking up said red, green and blue color signals using red, green and blue color sensors each having a horizontal read-out register;

generating first n-phase clock signals from a pixel clock signal; and processing said first n-phase clock signals to form second n-phase clock signals for said read-out register of said green color sensor in order to form an electronic half pixel offset for said green color signal with respect to said red and blue color signals.

5. A method as claimed in claim 4, wherein said red, green and blue color sensors each have an image part, a storage part and said horizontal read-out register, and said processing step includes the steps:

multiplexing said first n-phase clock signals with a given set of fixed values to form third n-phase clock signals for said red and blue color signals;

multiplexing said first n-phase clock signals with an inverse of said given set of fixed values to form said second n-phase clock signals for said green color signal; and controlling said multiplexing steps with a control signal so that said multiplexing steps supply said given set of fixed values and said inverse of said given set of fixed values, respectively, during a charge transfer between said storage parts and said horizontal read-out registers, and supply said second and third n-phase clock signals, respectively, during read-out from said horizontal read-out registers.

6. A device for obtaining an electronic half pixel offset for one color signal with respect to other color signals, said device comprising:

means for generating first n-phase clock signals from a pixel clock signal; and means for processing said first n-phase clock signals to form second n-phase clock signals in order to obtain said electronic half pixel offset for said one color signal.

7. A color camera for generating red, green and blue color signals, said color camera comprising:

red, green and blue color sensors for picking-up said red, green and blue color signals, each color sensor having a horizontal read-out register;

means for generating first n-phase clock signals from a pixel clock signal; and means for processing said first n-phase clock signals to form second n-phase clock signals for said read-out register of said green color sensor in order to obtain an electronic half pixel offset for said green color signal with respect to said red and blue color signals.

* * * * *